Oct. 3, 1939.  E. T. W. BAILEY  2,174,547
VALVE
Filed April 21, 1938  2 Sheets-Sheet 1
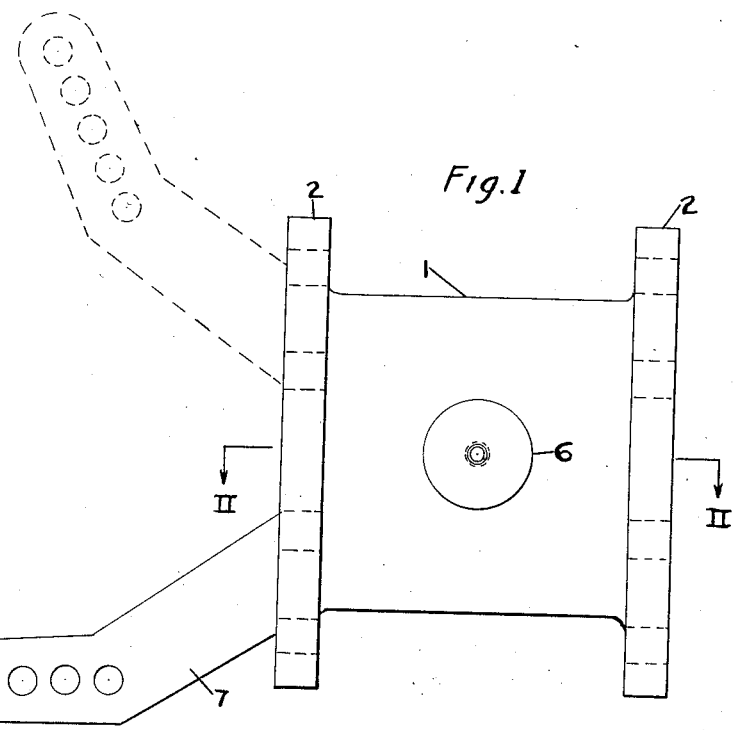
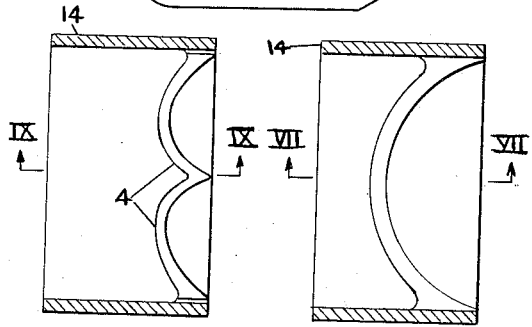
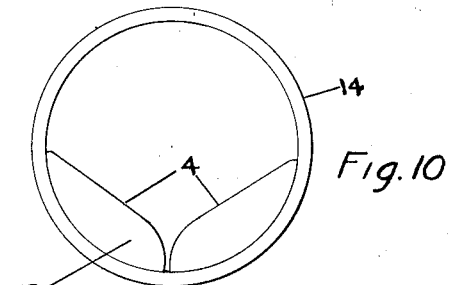
Fig.10
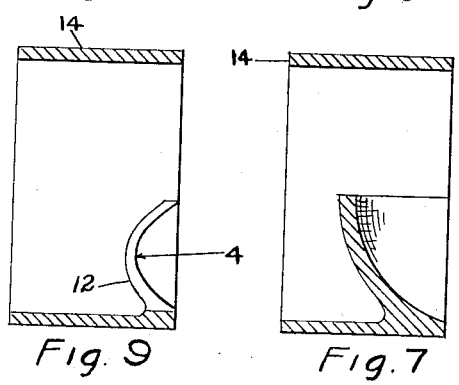
Fig.8  Fig.9
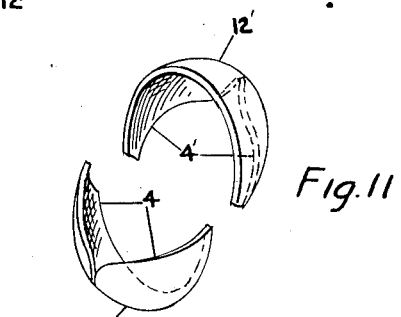
Fig.6  Fig.7
Fig.11
INVENTOR
Edward T. W. Bailey
by Gerald B. Fjoflat
his attorney

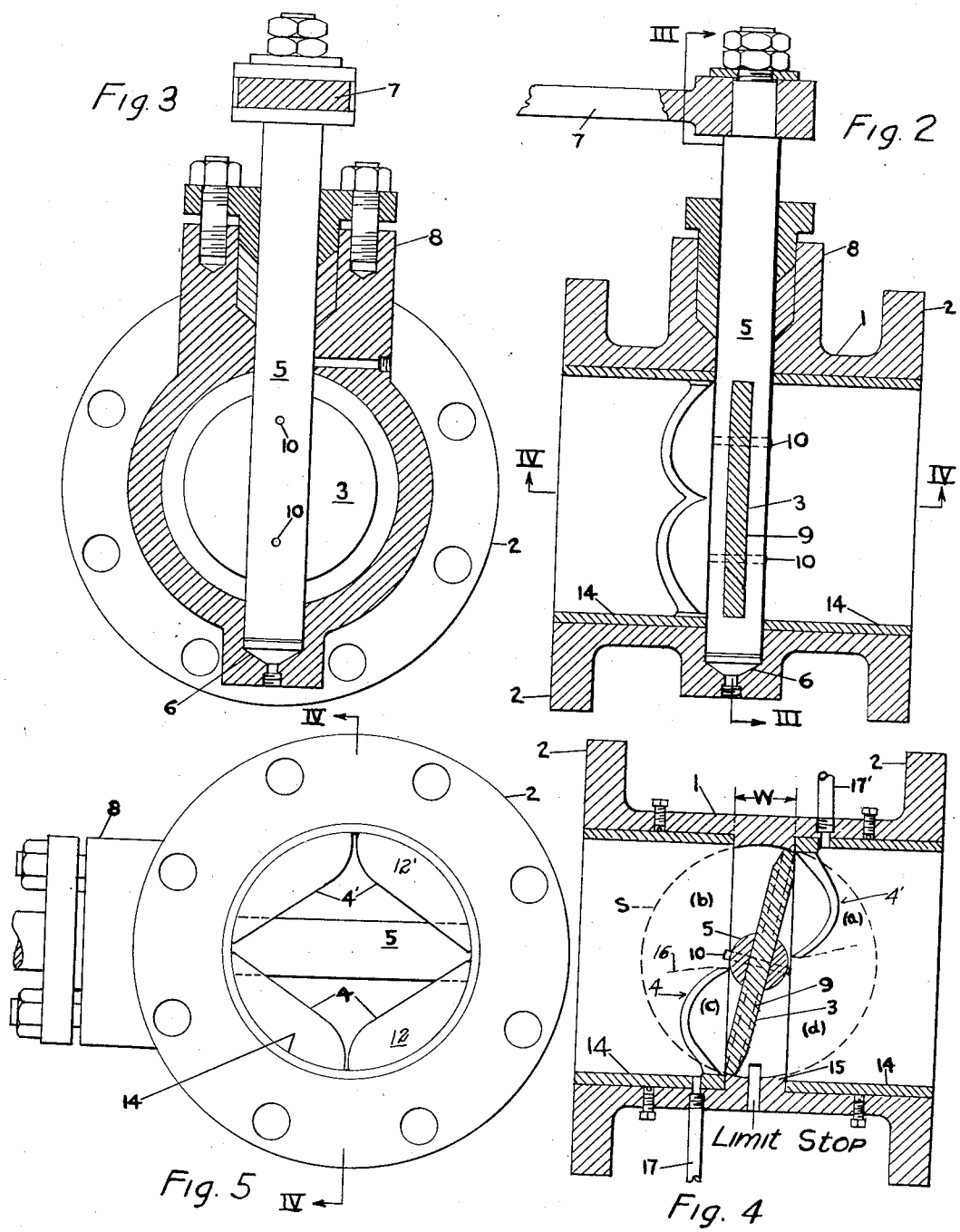

Patented Oct. 3, 1939

2,174,547

UNITED STATES PATENT OFFICE 2,174,547

VALVE

Edward T. W. Bailey, Hamilton, Ontario, Canada

Application April 21, 1938, Serial No. 203,294

6 Claims. (Cl. 251—11)

This invention relates to valves and more particularly to improvements in butterfly valves, and it is an object thereof to provide a butterfly valve with ports of such design and configuration that any predetermined flow characteristics may be obtained throughout full range travel of the butterfly.

Another object of the invention is to provide a butterfly valve of the character referred to whereby any predetermined relationship may be maintained between rate of flow through the valve and linear travel of the operating mechanism of the valve.

Ordinarily, the operating mechanism of a butterfly valve has a linear travel or movement, but the butterfly or disc of the valve has angular movement. It is an object of this invention to provide an improved butterfly valve whereby any predetermined correlation or relationship may be maintained between linear travel of the operating mechanism and angular movement of the valve disc or butterfly, or a predetermined relationship between linear travel and flow through the valve may be obtained, or whereby a predetermined relationship between linear travel, angular movement of the butterfly and flow, may be obtained.

A further object of the invention is to provide a valve of the character referred to above that shall be tightly seated in closed position.

A still further object of the invention is to provide an improved butterfly valve having ports of such design and construction that the ports may be removed and replaced either with the same shape of ports or with ports of different shape depending on the particular flow characteristics desired.

And a still further object of the invention is to provide an improved butterfly valve that admits of use as a metering device.

Other objects of the invention will, in part, be apparent, and will, in part, be obvious from the following description taken in conjunction with the accompanying drawings, in which:

Fig. 1 is a bottom plan view of a valve assembly embodying improvements made in accordance with the invention:

Figs. 2, 3 and 4 are views in section taken on lines II—II, III—III and IV—IV of Figs. 1, 2 and 3 respectively;

Fig. 5 is an end view of the valve with the butterfly removed;

Fig. 6 is a view in section of an element entering into the port construction of the valve;

Fig. 7 is a view in section taken on line VII—VII of Fig. 6.

Fig. 8 is a view corresponding to that of Fig. 6 showing the element after the port has been formed therein.

Fig. 9 is a view in section taken on line IX—IX of Fig. 8;

Fig. 10 is an end view of valve element as shown in Figs. 8 and 9; and

Fig. 11 is a partial, exploded, perspective view of the two potted elements of the valve, the full details of such elements being as represented by Figs. 8, 9 and 10.

Throughout the drawings and the specification like reference characters indicate like parts.

The valve illustrated in the drawings as embodying what now appears to be a preferred form of the invention, comprises a valve body 1 having suitable flanges 2 at the ends thereof whereby the valve may be connected into a pipe line to control the flow of a fluid or gaseous medium. A butterfly valve 3 is disposed within the valve body to control the flow of a fluid or gas through ports 4 and 4'. Valve 3 is supported by and secured to a shaft 5, one end of which is journaled in a socket bearing 6 formed on the inside of the valve body and the other end of which extends outwardly through the valve body a sufficient distance to allow for the attachment of an operating lever 7. The lever end of shaft 5 extends through a stuffing box 8.

Shaft 5 is provided with a longitudinal centrally positioned slot 9 through which disc 3 extends, the disc being secured to the shaft by means of pins 10.

Ports 4 and 4' are formed in curved members 12 and 12' respectively, whose inner surfaces may be termed surfaces of revolution. The periphery or edge of valve 3 must therefore be so shaped that as it is turned on shaft 5, its periphery will describe a surface of revolution corresponding to that of the inner surfaces of members 12 and 12'.

The simplest surfaces of revolution are, for the purposes of this invention, spheroidal, hence members 12 and 12' are shown as being hollow, partial spheroids, in the walls of which ports 4 and 4' are formed. When members 12 and 12' are of such shape or form valve 3 may be a simple circular disc, so that it is rotated on the axis of shaft 5, its periphery develops a spheroidal surface.

Members 12 and 12' may be considered as having been made from a hollow sphere, whose inner contour is represented by broken line circle S, by cutting therefrom a ring portion having a width W, and the portions thereof lying within diagonally opposite quadrants (see Fig. 4). If these quadrants are numbered (a), (b), (c) and (d) then, as shown in Fig. 4, the portions lying within such diagonally opposite quadrants would be those located in quadrants (b) and (d). Shaft 5 is so positioned that it passes through the space represented by width W and with its longitudinal or rotational axis coincidental with the diameter of the spheroid of which members 12 and 12' are quarters.

In practice, it is preferred to make the quarter spheroidal members 12 and 12' as separate elements and to support them rigidly in place within the valve body. This may be accomplished by forming each one as an integral or unitary part of a tubular member or sleeve. Thus as shown in Figs. 2 and 4, members 12 and 12' are formed integrally with sleeves 14 and 14' respectively.

Sleeves 14 and 14' are pressed into valve body 1 from opposite ends thereof. To insure proper spacing between the adjacent inner ends of the sleeves and therefore proper spacing of members 12 and 12', and also to insure tight seating of the valve when disc 3 is in closed position, the bore of the valve body may be formed with a ring-like boss 15 whose width corresponds to dimension W of Fig. 4, and whose surface is curved to correspond to that of the surface of revolution developed by the rotation of the disc on shaft 5.

Figs. 6 and 7 are intended to illustrate the shape of members 12 or 12' before the ports are formed therein and also to indicate the manner of making the unit comprising a sleeve 14 or 14' and a member 12 or 12'. Such a unit may be made by welding or otherwise securing a hollow quarter sphere to the end of a sleeve and then cutting the port therein to any shape desired, or by casting the sleeve and its quarter spheroid with its port as a unit and then machining the surfaces that coact with the butterfly to the precision required.

Ports 4 and 4' are formed in the walls of members 12 and 12' respectively. As shown in the drawings, these ports are of V-shape in general contour, the widest opening in the same being at the place occupied by disc 3 when in its wide-open position and the narrowest opening therein being adjacent the rib or ring-like boss 15 at diametrically opposite points thereof.

When valve disc 3 occupies the position shown in Fig. 4, the valve is closed tight, the seating surface of the valve being formed either by contact of a very close fit between the edge surface of disc 3 and the surface of boss 15. As disc 3 is turned on shaft 5 in a clockwise direction, as seen in Fig. 4, flow can take place through the uncovered portions of ports 4 and 4', the flow areas of which increase as the disc is turned to the wide-open position indicated by line 16.

A valve having ports such as described above, provided accurate control of flow for all positions of the butterfly or disc 3 and particularly at low rates of flow, i. e., at the flows occurring when the disc is operating near its closed position. By giving the proper shape to ports 4 and 4', any predetermined relationship can be had between travel or position of any operating mechanism having linear movement that would be connected to lever or arm 7 and the rate of flow through the valve. Valves used for controlling flow are usually operated by mechanisms having linear motion, but as, in the case of butterfly valves, this motion is translated into rotary, the ordinary or prior art type of butterfly valve will not give the relationship between position of the operating mechanism and rate of flow. Depending on the shape of ports 4 and 4' this relationship can be linear or exponential.

The shape of the ports illustrated represents the shape of the projection of a triangle upon the surface of the quarter sphere shown in Figs. 6 and 7, but this shape may be modified to suit the particular flow control characteristics desired in any particular valve.

It may happen that when a valve such as herein disclosed, has been in operation for a time, the narrower portions of ports 4 and 4' may become clogged, particularly if the valve is controlling the flow of coal tar fuels. To provide for easy cleaning of the ports, the valve body and sleeves 14 and 14' are drilled and tapped at points adjacent the narrowest portions of the ports, to accommodate pipes 17 and 17' through which steam or other medium may be passed to impinge upon and remove any foreign matter that may have lodged in the ports.

Having thus described the invention, what I claim as new and desire to secure by Letters Patent is:

1. A fluid control valve comprising a valve body having a butterfly valve rotatively supported therein, members disposed on opposite sides of said butterfly valve, one of which being above and one below the axis of rotation of said valve, said members each having a curved surface corresponding to substantially a quarter of the surface of revolution of said butterfly valve, said surface having substantially a fluid-tight fit with the edge surface of said butterfly valve, said members each having a substantially V-shaped port therein.

2. A fluid control valve comprising a valve body having a butterfly valve rotatively supported therein, and members of substantially quarter spheroidal shape disposed within said body, one on each side of said butterfly valve and one disposed above and one below the axis of rotation of said valve, said members having ports therein of such shape that the openings therein increase in area from diametrically opposite sides of the valve body toward the axis of rotation of said butterfly valve.

3. A fluid control valve according to claim 1 characterized by the fact that a sleeve extends into said valve body from each end thereof, and that one of said members having a V-shaped port therein is formed integrally with one of said sleeves and that the other of the members having a V-shaped port therein is formed integrally with the other of said sleeves.

4. A fluid control valve according to claim 1 characterized by the fact that a sleeve is disposed in each end of the valve body, and that one of said curved surface members is integral with one of said sleeves and that the other quarter spheroidal-shaped member is integral with the other of said sleeves.

5. A fluid control valve according to claim 1 characterized by the fact that the portion of interior surface of the valve body lying between said ported members is curved to conform to the surface of revolution developed by the rotation of said butterfly valve and to form a tight seal with the edge of said butterfly valve when the same is in closed position.

6. A fluid control valve according to claim 1 characterized by the fact that means are provided to form a fluid-tight seat with the butterfly valve when the same is in closed position.

EDWARD T. W. BAILEY.